No. 728,551. PATENTED MAY 19, 1903.
O. J. DAHL.
STUMP EXTRACTOR.
APPLICATION FILED SEPT. 6, 1902.
NO MODEL. 3 SHEETS—SHEET 2.
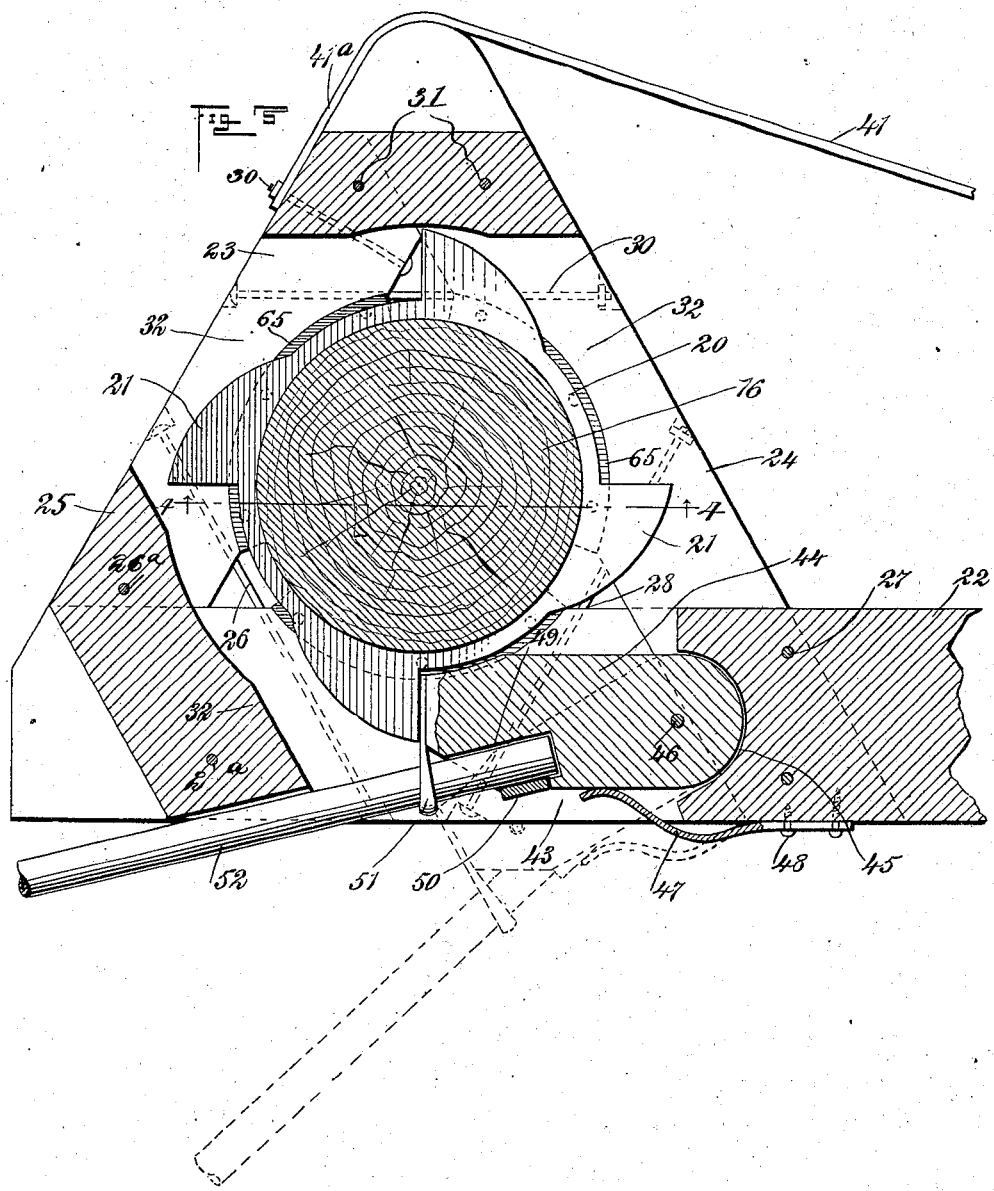
WITNESSES:
INVENTOR
Ole J. Dahl
BY
ATTORNEYS.

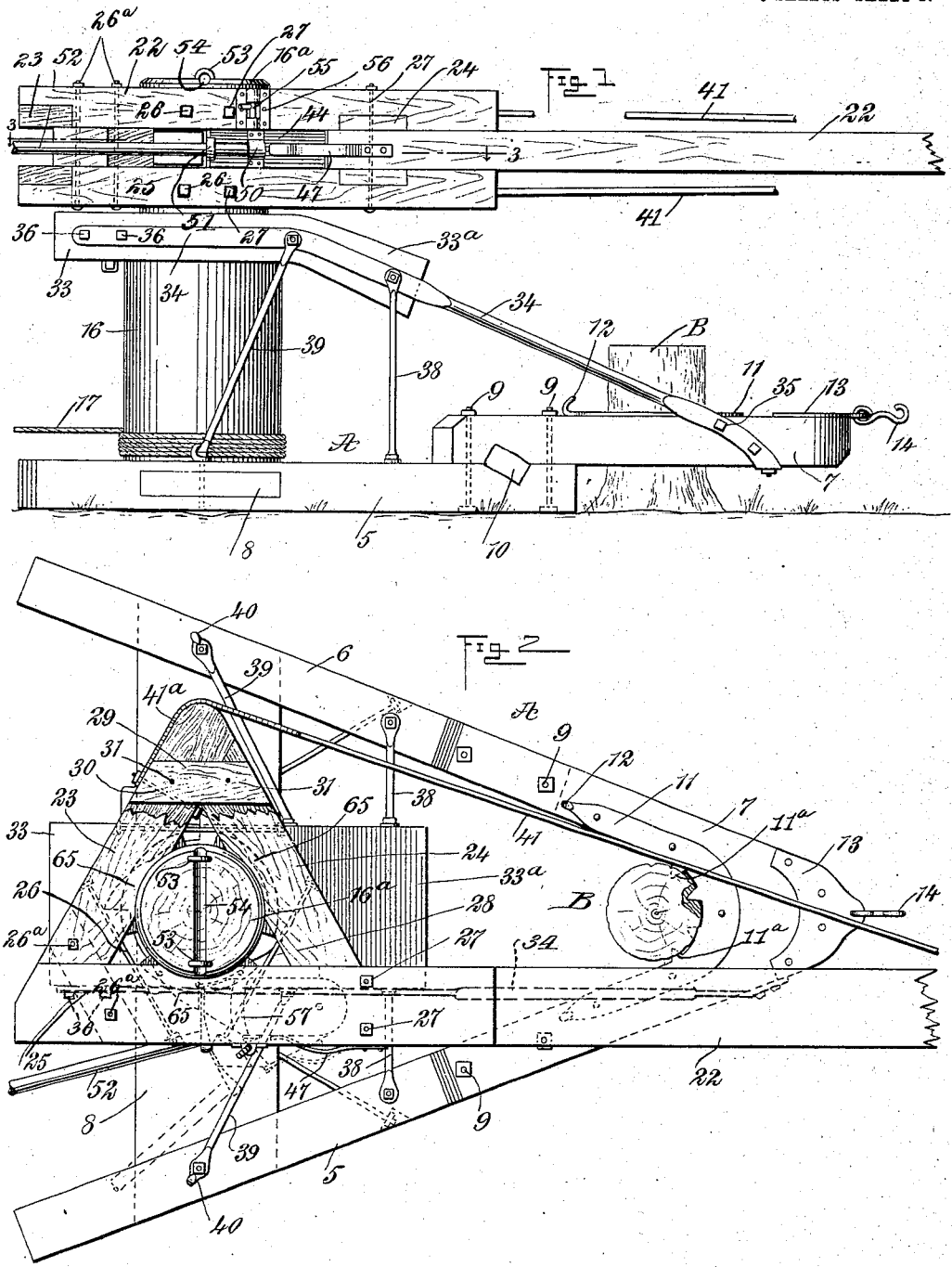

No. 728,551. PATENTED MAY 19, 1903.
O. J. DAHL.
STUMP EXTRACTOR.
APPLICATION FILED SEPT. 6, 1902.
NO MODEL. 3 SHEETS—SHEET 3.
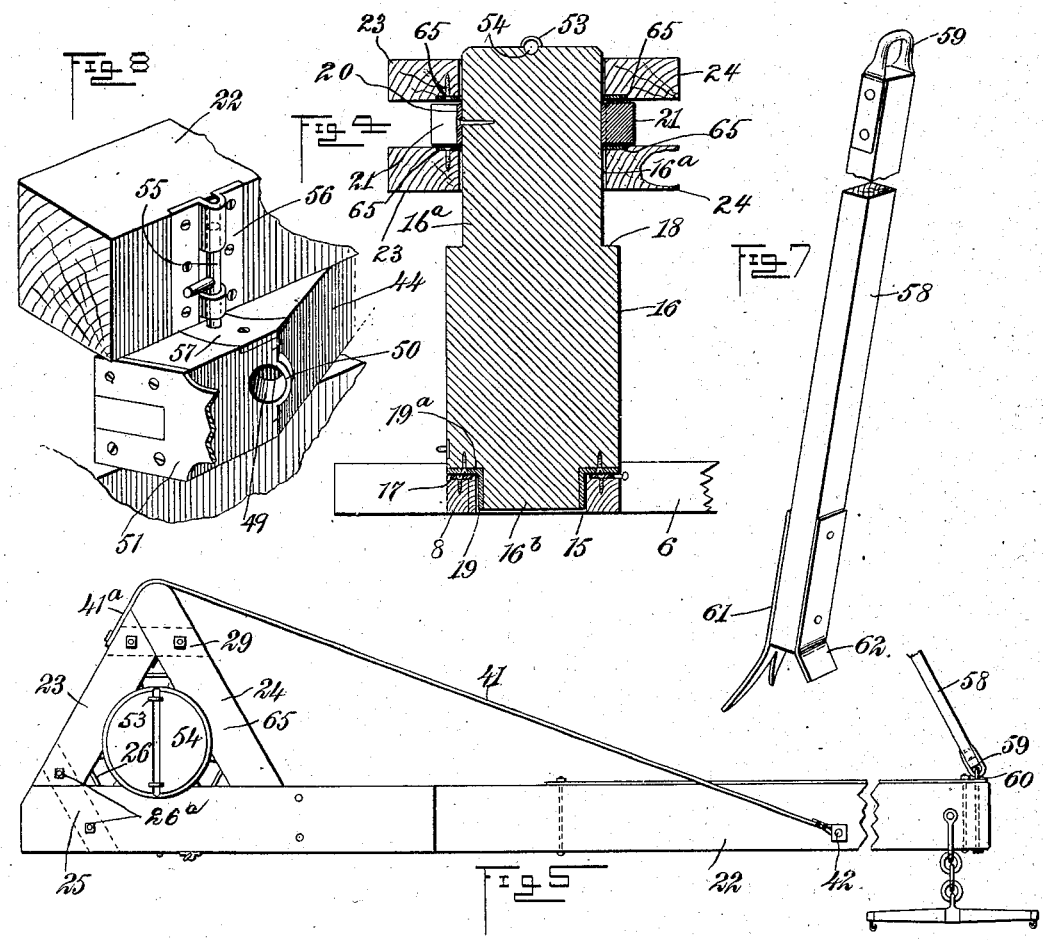
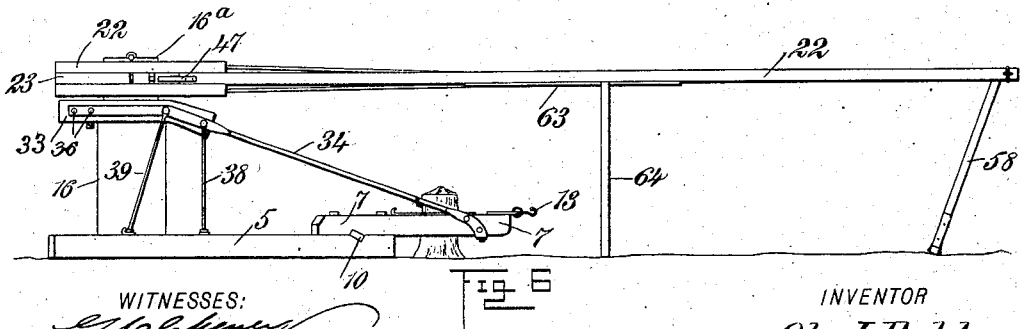
WITNESSES:
INVENTOR
Ole J. Dahl
BY
ATTORNEYS.

No. 728,551. Patented May 19, 1903.

UNITED STATES PATENT OFFICE.

OLE JOHNSON DAHL, OF ANTHONY, WISCONSIN.

STUMP-EXTRACTOR.

SPECIFICATION forming part of Letters Patent No. 728,551, dated May 19, 1903.

Application filed September 6, 1902. Serial No. 122,329. (No model.)

*To all whom it may concern:*

Be it known that I, OLE JOHNSON DAHL, a citizen of the United States, and a resident of Anthony, in the county of Eau Claire and State of Wisconsin, have invented a new and Improved Stump-Extractor, of which the following is a full, clear, and exact description.

My invention relates to improvements in stump-extractors; and one object that I have in view is to provide a simple and cheap construction which can be anchored directly to a stump without the intervention of a chain or cable, which can be easily shifted around a stump, which may be readily moved from one place to another, and which is efficient in operation and cheap of manufacture.

A further object is to provide means for easily and quickly taking up the slack in the cable by operating the drum by hand and while the sweep is at rest.

A further object is to provide simple means for sustaining the weight of the sweep when the machine is at rest, thus simplifying the machine by dispensing with a sweep-balancing device and relieving the horse of the burden of the sweep.

Further objects and advantages of the invention will appear from the subjoined description, and the novelty will be defined by the appended claims.

Reference is to be had to the accompanying drawings, forming a part of this specification, in which similar characters of reference indicate corresponding parts in all the figures.

Figure 1 is a side elevation with parts broken away, showing my improved extractor in operative position relative to an anchor-stump. Fig. 2 is a plan view of the apparatus shown in Fig. 1. Fig. 3 is an enlarged horizontal section taken in the plane of the dotted line 3 3 of Fig. 1 looking in the direction of the arrows. Fig. 4 is a vertical detail section on the line 4 4 of Fig. 3 through the windlass or drum and showing means by which it is stepped in or mounted upon the anchor-frame. Fig. 5 is a detail view of the complete apparatus, a part of the sweep being broken away. Fig. 6 is a side elevation of the apparatus on the same scale as Fig. 5 and illustrating the means for supporting the free end of the sweep. Fig. 7 is a detail perspective view of the drag-bar adapted for connection with the sweep, and Fig. 8 is a detail view of the means for locking the dog in a retracted position.

In carrying my invention into practice I provide an anchor-frame adapted to support the operating parts of the apparatus and to be engaged directly with an anchor-stump, thereby dispensing with a cable or chain for the purpose of hitching the apparatus to the stump. This anchor-frame is indicated in its entirety by the reference character A, and it consists of the inclined members 5 6, the yoke-shaped member 7, and the transverse member 8. The members 5, 6, and 8 are timbers suitably framed together by having the end portions of the timber 8 recessed in the members 5 6, the latter being arranged in the converging relation shown more clearly by Fig. 2.

The yoke-shaped member 7 consists of inclined legs joined by a solid integral curved portion or bight, as shown more clearly by Fig. 2, and the legs of this yoke-shaped member are disposed in overlapping relation to the contiguous end portions of the converging members 5 6, whereby the yoke and the converging members may be joined firmly together by the bolts 9.

In order to more securely unite the legs of the yoke to the converging members, I prefer to employ the key-blocks 10, which are disposed in diagonal or inclined relation to the members 5 6 7 and are set in recesses in the overlapping portions of these parts, as shown more clearly by Fig. 1. The bight of the yoke-shaped member 7 is reinforced by the employment of a metallic stay-plate 11, which is secured to the top face thereof and extends around the curved part of the same. The end portions of this stay-plate 11 are tapered and bent to produce the hooks 12, the latter lying on opposite sides of the median line of the frame and affording means for the attachment of a pull-cord in order to shift the position of the apparatus. This yoke-shaped member 7 is furthermore provided with a clevis-plate 13, to which is loosely connected a draft-clevis 14, thus making provision for the attachment of a draft device which may be employed for hauling the apparatus from one stump to another.

The transverse timber 8 of the anchor-frame is provided at its middle portion with a vertical circular opening 15, which forms a step-bearing for the vertically-disposed drum or windlass 16. This frame-timber 8 is provided on its upper side with a metallic wear ring or plate 17, which may be made of one continuous circular piece of metal, or it may be made in sections, said wear plate or ring being firmly fastened to the upper face of the timber 8 by recessing it in the timber, as shown by Fig. 4.

In practice I prefer to employ a drum or windlass 16, which is quite long and of wide diameter, thus making provision for coiling the rope or cable 17 on the surface of said drum in a manner to overcome kinking of the cable and cutting or wear of the same through extended use of the apparatus. The drum 16 is reduced in diameter at its upper portion, as indicated at $16^a$, thereby forming an intermediate shoulder 18, and the lower part of the drum 16 is also reduced, as indicated at $16^b$, the length of the reduced lower portion $16^b$ being less than the upper portion $16^a$. (See Fig. 4.) This reduced lower end of the drum is reinforced by a metallic hoop or band 19, the latter having a radial flange $19^a$, that bears against the shoulder formed by the reduced portion $16^b$. The hoop or band 19 is angular in cross-section and applied to those faces of the drum which are exposed to wear, thereby strengthening the drum and minimizing the friction and wear on that part of the drum which is stepped in the cross-timber 8 of the anchor-frame. The metallic band or hoop is adapted to enter the bearing or socket 15 of the anchor-frame, while the flange $19^a$ rests upon the wear-ring 17, the described construction of the flanged hoop or band bringing the metallic parts 17 $19^a$ in engagement with each other and insuring free rotation of the drum in the anchor-frame.

20 designates a ratchet, which is cast in a single piece of metal with a series of outwardly-projecting lugs or teeth 21, said ratchet being in the form of an annular band or hoop, the outer surface of which is broken by the teeth or lugs. This ratchet is secured firmly in any suitable way to the upper reduced part $16^a$ of the drum, said ratchet occupying a spaced and parallel relation to the shoulder 18. (See Fig. 4.) Each lug or tooth 21 of the ratchet is provided with a radial shoulder on one side and with a curved face on the opposite side, and the series of lugs 21 are preferably equidistant around the peripheral edge of the ratchet hoop or band, all of the radial shoulders of the lug facing in one direction.

22 designates the sweep, which is provided at its inner end with a head adapted to loosely fit the upper reduced part $16^a$ of the drum. This head is formed by the inner portion of the sweep and the members 23 24, all the parts being joined together in a substantial way. The member 23 of the head lies at an angle to the end portion of the sweep, while the other member 24 is reversely inclined to the member 23, so as to lie at an angle to the sweep and to said member 23, one end portion of the member 24 being fastened to the sweep, while the other end of said member 24 meets the inclined member 23. The member 23 and the sweep are stayed by the truss-block 25, the vertical bolts $26^a$, and by the bolt 26, the latter passing through the sweep and the member 23. The other member 24 is secured to the sweep by the bolts 27 and the tie-rod 28, the latter passing diagonally through the sweep and said member 24, as shown by Figs. 2 and 3.

The meeting ends of the inclined members 23 24 are braced by the truss-block 29 and the bolt 30, and this truss-block 29 is fastened securely to said inclined members 23 24 by the bolts 31. The members 23 24 and the sweep 22 are disposed in substantially triangular relation, (see Figs. 2 and 3,) and the inner faces of these parts are recessed, as indicated at 32 in Fig. 3. The head formed by the members of the sweep is of substantial construction and arranged to fit loosely around the upper reduced part $16^a$ of the drum. This head is arranged above a bearing-block 33, which lies below the sweep-head and is adapted to engage with the annular shoulder 18 of the drum. The bearing-block 33 occupies a stationary position over and parallel to the members 5 6 of the anchor-frame, and the front part of this bearing-block is preferably disposed in a downwardly-inclined position, as at $33^a$ in Fig. 1.

The bearing-block is connected to the anchor-frame by a plurality of stays or braces, and in the drawings I have shown two of these stays in the form of rods 34, which are disposed in inclined positions, the front lower ends of the rods being fastened to the yoke 7 of the anchor-frame by the bolts 35, while the rear portions of the rods are carried along the side edges of the bearing-block 33 and secured thereto by the bolts 36. A pair of brace-rods 38 are fastened to the front inclined portion 33 of the bearing-block and to the front ends of the frame members 5 6, and another pair of stay-rods 39 are fastened to the bearing-block 23 and to the rear portions of the frame members 5 6, said stay-rods 39 terminating at their lower ends in the hooks 40, as shown by Figs. 1 and 2. These hooks provide convenient means for the attachment of a rope or other device which may be employed to turn the apparatus around the anchor-stump B.

The members 23 24 of the sweep-head are braced by stay-rods 41 in addition to the truss-blocks, the stay-rods, and the bolts heretofore described. One end of each stay-rod 41 is attached to the sweep by a bolt 42, located at a point some distance from the head, (see Fig. 5,) while the other end of said rod is bent, as at $41^a$, around the member 23 and secured in place in any suitable way. (See Figs. 2 and 3.) The sweep-head is fitted loosely on the upper part $16^a$ of the drum above the bearing-block 33 and in a position for the recessed portions 32 of the members forming the sweep-head to lie in the plane of the ratchet 20. (See Fig. 3.) The loose fitting of the sweep-head on the drum allows the sweep to turn idly around the drum; but I have provided means whereby the sweep may be made fast with said drum when the sweep is turned in one direction.

The inner portion of the sweep is provided in addition to the recess 32 with a transverse slot 43, in which is arranged a pawl or dog 44, the latter having a curved heel which fits loosely in a curved seat 45 in the sweep. This dog is pivotally supported in the slotted part of the sweep by a bolt 46, and the nose or free end of the dog is adapted to engage with the radial shoulder of either of the lugs 21 on the ratchet. To hold the dog in engagement with the ratchet, I employ a pressure-spring 47, the latter being preferably in the form of a leaf-spring and having one end fastened to the sweep, as at 48, while its free end is arranged to bear against the rear side of the dog, as shown more clearly by Fig. 3. This spring-pressed dog is carried by a lever and adapted to engage with the ratchet on the drum, so that the dog makes the sweep fast with the drum, and the motion of the sweep is communicated to the drum for the purpose of coiling the cable 17 thereon.

The dog 44 is provided with a socket 49, the latter being partially closed by means of a metallic plate 50, attached to the outer side of the dog. A keeper or loop 51 is fastened to the end of the dog in position to aline or register with the socket 49, and a handle-bar 52 is adapted to be thrust through this keeper and into the socket 49 for the purpose of withdrawing the dog from engagement with the ratchet. This handle-bar is removably attached to the dog, and when disengaged said handle-bar may be removably attached to the upper end of the drum 16. The means for securing the handle-bar to the drum consists of the keepers 53, which are fastened to the upper exposed end of the drum in positions to straddle a diametrical recess 54. (Shown more clearly by Fig. 2.)

It is evident that the handle-bar 52 may be fitted in the recess 54 and held against displacement by the keepers 53, thus providing means for rotating the drum 16 by hand in order to take up the slack in the cable 17, whereby the necessity for operating the sweep in order to take up slack in the cable is overcome. When the dog 44 is moved to its retracted position, as indicated by dotted lines in Fig. 3, a locking-bolt 55 may be dropped in engagement with said dog in order to maintain the latter free from engagement with the ratchet. This locking-bolt 55 is slidably mounted in a supporting-plate 56, that is attached to the outer side of the sweep 22, as shown by Figs. 1 and 2. The upper edge of the dog is provided with a perforated plate 57, into which may drop the lower end of the bolt 55. This bolt is provided with a finger-piece at its upper end, and it is arranged to turn in its guide as well as to slide therein, whereby the bolt may be held in a raised position by engagement with a part of the plate 56.

58 designates a drag-bar, which is loosely connected to the sweep 22 at or near its free end. (See Fig. 6.) This drag-bar is provided at its upper end with a clip 59, which engages with a bolt 60, fastened to the sweep, and at its lower end said drag-bar is provided with a toothed plate 61 and with a fender-plate 62. The drag-bar is adapted to trail on the ground and follow the sweep, and the toothed plate 61 of this bar is adapted to penetrate the ground and prevent the sweep from turning in a backward direction.

The under side of the sweep 22 is provided with a rest-plate 63, against which bears a prop 64, the latter adapted to be placed below the sweep when it is at rest and to support the weight of the sweep, thus preventing said sweep and the machine from tilting to an inoperative position.

The members forming the sweep-head are provided with metallic plates 65, which are secured firmly thereto by screws or bolts and are curved to embrace the drum at the upper reduced portion $16^a$ thereof. These metallic plates 65 are fastened to the inner part of the triangular sweep-head in positions to lie above and below the metallic ratchet 21 on the drum, as shown more clearly by Fig. 4, and said metallic plates fit around the reduced part $16^a$ of the drum. The metallic plates 65 of the sweep-head thus engage with the metallic ratchet 21 to hold the sweep-head against vertical displacement and to prevent it from dropping down on the bearing-block 33.

The stay-plate 11 is provided on its concave side or edge with a series of spurs or teeth $11^a$, which are adapted to be embedded in the anchor-stump B, and these teeth serve to hold the stump-puller against turning around or from becoming displaced on the stump B.

The handle-bar 52 can be used for three purposes—first, to adjust the dog 44 from engagement with the ratchet; second, to engage with the keepers 53 and groove 54 in order to turn the drum for taking up slack in the cable, and, third, it may be fitted in the hooks 12 and engaged with the anchor-stump for the purpose of pulling or shifting the stump-puller around said stump B.

The bar 64 is only used when the sweep is at rest and it is desired to take up or pull the cable off the drum. When the apparatus is not in use, the weight of the sweep pries on the ratchet and the drum, so that the latter cannot be turned easily, and this bar 64 is employed to sustain the weight of the sweep to the end that the drum can be turned easily.

Having thus described my invention, I claim as new and desire to secure by Letters Patent—

1. A stump-extractor, comprising an anchor-frame, a revoluble drum mounted on said frame, a bearing-block secured to the frame and engaging with said drum, a sweep fitted loosely on the drum, and means for connecting said sweep and drum.

2. In a stump-extractor, an anchor-frame consisting of converging members joined by a transverse member, and a yoke-shaped member fastened to the converging members and having a face adapted for engagement with an anchor-stump, combined with a drum mounted on said frame, a sweep, and means for making said sweep fast with said drum.

3. In a stump-extractor, an anchor-frame comprising connected side members and a transverse member provided with a step-bearing and with a metallic wear-plate, and a drum having its lower end reinforced by a wear-plate arranged to engage with the metallic plate of the anchor-frame, combined with a sweep fitted loosely to the drum, and means for making said sweep fast with said drum.

4. In a stump-extractor, the combination with a drum, of a ratchet fast therewith, a sweep having a head fitted loosely on said drum to inclose the ratchet thereon, a dog mounted on the sweep and engaging with said ratchet, and a spring for normally impelling the dog into engagement with the ratchet.

5. In a stump-extractor, a sweep provided with a head formed by converging members disposed at different angles to the sweep and firmly stayed to one another, the opposing faces of the sweep-head being recessed, combined with a drum fitted loosely in an opening of the sweep-head, a ratchet fast with said drum and disposed in the plane of the recesses of the sweep-head, and a dog carried by the sweep and adapted to engage with said ratchet.

6. In a stump-extractor, the combination of a drum, a sweep-head fitted loosely thereto, a ratchet fast with said drum, a dog pivoted in the sweep, and a handle-bar adapted to be connected detachably to the dog and to an upper exposed end of said drum.

7. In a stump-extractor, the combination of a drum provided with keepers, a handle-bar fitted removably in said keepers, a sweep having a head fitted loosely on said drum, a ratchet fast with the drum, and a dog carried by the sweep and arranged to engage with said ratchet.

8. In a stump-extractor, the combination with a drum, of a sweep provided with a slot, a dog pivoted in the slotted part of the sweep, a locking-bolt carried by the sweep and arranged to engage with the dog when the latter is retracted, and a handle-bar secured removably to said dog.

9. In a stump-extractor, the combination of an anchor-frame, a bearing-block secured by braces to said anchor-frame, a drum mounted in the frame and the bearing-block, a ratchet on said drum, a sweep having a head fitted loosely on the drum, and a dog carried by the sweep for engagement with said ratchet.

10. A stump-extractor comprising a frame, a vertical drum, a sweep having a head fitted loosely on said drum, a ratchet fixed to the drum and lying loosely within the sweep-head, a dog carried by the sweep-head and arranged to engage said drum, and a drag-bar connected to the sweep and arranged to sustain the latter against the exertion of leverage through the sweep-head on the drum.

In testimony whereof I have signed my name to this specification in the presence of two subscribing witnesses.

OLE JOHNSON DAHL.

Witnesses:
  SIMON SIMONSON,
  GILBERT J. DAHL.